United States Patent [19]

Brown

[11] Patent Number: 4,946,666
[45] Date of Patent: Aug. 7, 1990

[54] PROCESS FOR THE PRODUCTION OF FINE TABULAR ALUMINA MONOHYDRATE

[75] Inventor: Neil Brown, Bonn, Fed. Rep. of Germany

[73] Assignee: Vereinigte Aluminum-Werke Aktiengesellschaft, Fed. Rep. of Germany

[21] Appl. No.: 233,885

[22] Filed: Aug. 15, 1988

Related U.S. Application Data

[63] Continuation of Ser. No. 17,308, Feb. 20, 1987, abandoned, which is a continuation-in-part of Ser. No. 847,634, Apr. 3, 1986, Pat. No. 4,668,486.

[30] Foreign Application Priority Data

Apr. 4, 1985 [DE] Fed. Rep. of Germany ....... 3512404

[51] Int. Cl.$^5$ ............................................... C01F 7/02
[52] U.S. Cl. .................................... 423/625; 423/628; 423/629; 423/630; 423/121; 423/122; 423/124; 423/130; 502/355; 501/127
[58] Field of Search ............... 423/121, 122, 124, 130, 423/625, 630, 628, 629; 502/355; 501/127

[56] References Cited

U.S. PATENT DOCUMENTS

| | | | |
|---|---|---|---|
| 1,943,786 | 1/1934 | Cowles ................................. | 423/124 |
| 4,280,987 | 7/1981 | Yamada et al. ...................... | 423/130 |
| 4,492,682 | 1/1985 | Trebillon ............................. | 423/625 |
| 4,663,133 | 5/1987 | Malito et al. ........................ | 423/130 |
| 4,668,486 | 5/1987 | Brown et al. ....................... | 423/121 |

FOREIGN PATENT DOCUMENTS

| | | | |
|---|---|---|---|
| 1178049 | 9/1964 | Fed. Rep. of Germany ...... | 423/124 |
| 382366 | 10/1932 | United Kingdom ............... | 423/124 |

*Primary Examiner*—Robert L. Stoll
*Attorney, Agent, or Firm*—Darby & Darby

[57] ABSTRACT

The present invention provides a process for the production of fine, tabular boehmite crystals substantially within the size range of 0.2–0.8 microns. The crystals are particularly suitable for use as a pigment/filler in paper, paint and ink applications.

19 Claims, 4 Drawing Sheets

PROCESS FOR THE PRODUCTION OF FINE TABULAR ALUMINA MONOHYDRATE

This is a continuation of application Ser. No. 017,308, filed Feb. 20, 1987, now abandoned, which is a continuation-in-part of Ser. No. 847,634 filed Apr. 3, 1986, now U.S. Pat. No. 4,668,486.

FIELD OF THE INVENTION

This invention relates to a process for the production of fine, tabular alpha-alumina monohydrate (boehmite) crystals suitable for use as a pigment/filler.

BACKGROUND OF THE INVENTION

The present invention provides a process for the production of boehmite crystals of a size and a shape suitable for use as a pigment/filler in paper, paint and ink applications.

It is known that boehmite is the thermodyamically stable phase of alumina monohydrate at temperatures greater than 100° C. in liquors of the well-known Bayer process for the production of alumina from bauxite. Accordingly, boehmite can be precipitated at temperatures above 100° C. from these caustic aluminate liquors. Although the initial rate of boehmite precipitation increases with increasing temperature, the yield may decrease since the degree of supersaturation with respect to alumina decreases.

The greatest degree of boehmite precipitation has been shown to occur in Bayer liquors under hydrothermal conditions (i.e., conditions of elevated temperature and pressure) of about 140° C. when employing a caustic aluminate liquor having a molar ratio of 1.3, a retention time in the autoclave of 4–12 hours and a large seed charge, 260–340 g/l of boehmite crystals.

The term molar ratio can be defined as follows:

(Moles Caustic in Solution)/(Moles Alumina in Solution) $(1.645) \times [\text{g/l Na}_2\text{O}_{free}]/[\text{g/l Al}_2\text{O}_3]$ In the above equation, $\text{Na}_2\text{O}_{free}$ is defined as the amount of caustic present as NaOH and combined with alumina.

For example, a Bayer liquor which contains 140 g/l of free caustic (expressed as $\text{Na}_2\text{O}_{free}$) and 177 g/l alumina has a molar ratio of 1.3 using the above equation.

Alternatively, it is known that, depending upon the liquor composition, under atmospheric pressure conditions, and at temperatures of up to about 140° C., crystalline boehmite can be precipitated from Bayer liquors. This is accomplished using 100 g/l of a very fine gel-type boehmite seed (such as CATAPAL, made by CONOCO INC.), a 1.4 to 1.5 molar ratio and a retention time of 6 hours in the autoclave, as described for example in the West German Patent application of C. Miara et al., DE 3528534A1 (Aug. 8, 1985).

However, neither of the above-mentioned methods are suited to the production of fine boehmite crystals for use in pigment/filler applications because the products are too coarse. Moreover, despite the fact that both methods are seeded processes, they provide relatively low yields of boehmite in relation to the amount of seed used, and also in relation to the high alumina content of the starting liquor. Consequently, the liquors must be treated further, so that after separation of boehmite, the remaining alumina concentrations can be lowered to economical levels.

As described in copending U.S. Pat. Application Ser. No. 847,634, now U.S. Pat. No. 4,668.486, a Bayer spent i.e., a liquor having a high $\text{Na}_2\text{O}_{free}/\text{Al}_2\text{O}_3$ molar ratio and a low alumina content, when subjected to organics oxidation (i.e., a process for removing from the Bayer liquors organic contaminants present in the original bauxite used) in the presence of copper catalyst ions, can be induced to precipitate about 50% of its alumina content as copper-containing boehmite. This process is conducted under hydrothermal conditions (increased pressure and temperature) and the copper-containing boehmite is recycled as a catalyst/catalyst carrier system. In addition, no seeding of the liquor is necessary for boehmite crystallization. Moreover, the retention time requirement (the amount of time that the liquor to be oxidized must remain within the autoclave) for the combined organics oxidation - boehmite crystallization is of the order of one hour or less. However, the boehmite particles precipitated by this process are not suitable for paint, ink and filler applications because of their coarse size (5–15 microns).

As mentioned above, none of the prior art methods for precipitating alumina can be used to produce fine boehmite crystals for use in a pigment/filler application. Therefore, what is needed is a novel process for the production of such boehmite crystals. The present inventor has unexpectedly found that if the organics oxidation of a Bayer caustic aluminate liquor is carried out in the absence of copper ions and if the hydrothermal boehmite crystallization is carried out under conditions of vigorous agitation, then the resulting boehmite crystals have a particle size and form that renders them well-suited for use as pigments and/or fillers in paints, papers, inks and the like. Advantageously, using the method of the present invention, the boehmite is crystallized out from an organics-oxidized (i.e decontaminated by breakdown of organic carbon contaminants) Bayer liquor which is low in organic carbon content and hence, relatively colorless.

It is therefore an object of the present invention to provide a process for the production of a novel, fine, tabular, crystalline boehmite.

It is a further object of the present invention to provide novel boehmite crystals of a fine, tabular form.

A still further object of the present invention is to provide boehmite crystals having a particle size of between about 0.2 and 0.8 microns and essentially tabular (i.e., flat) shape.

As used herein, "tabular" is defined as flat crystals, i.e., crystals having one dimension substantially smaller than the other two dimensions. Substantially smaller is defined as having one of their average height, width and length dimensions to be less than about 50% of the other two dimensions. It should be noted that the tabular crystals can be square, diamond and hexagonal-shaped.

These and other objects of the present invention will be apparent to those of ordinary skill in the art in the light of the present description, accompanying claims and appended drawings.

SUMMARY OF THE INVENTION

Figure 1:
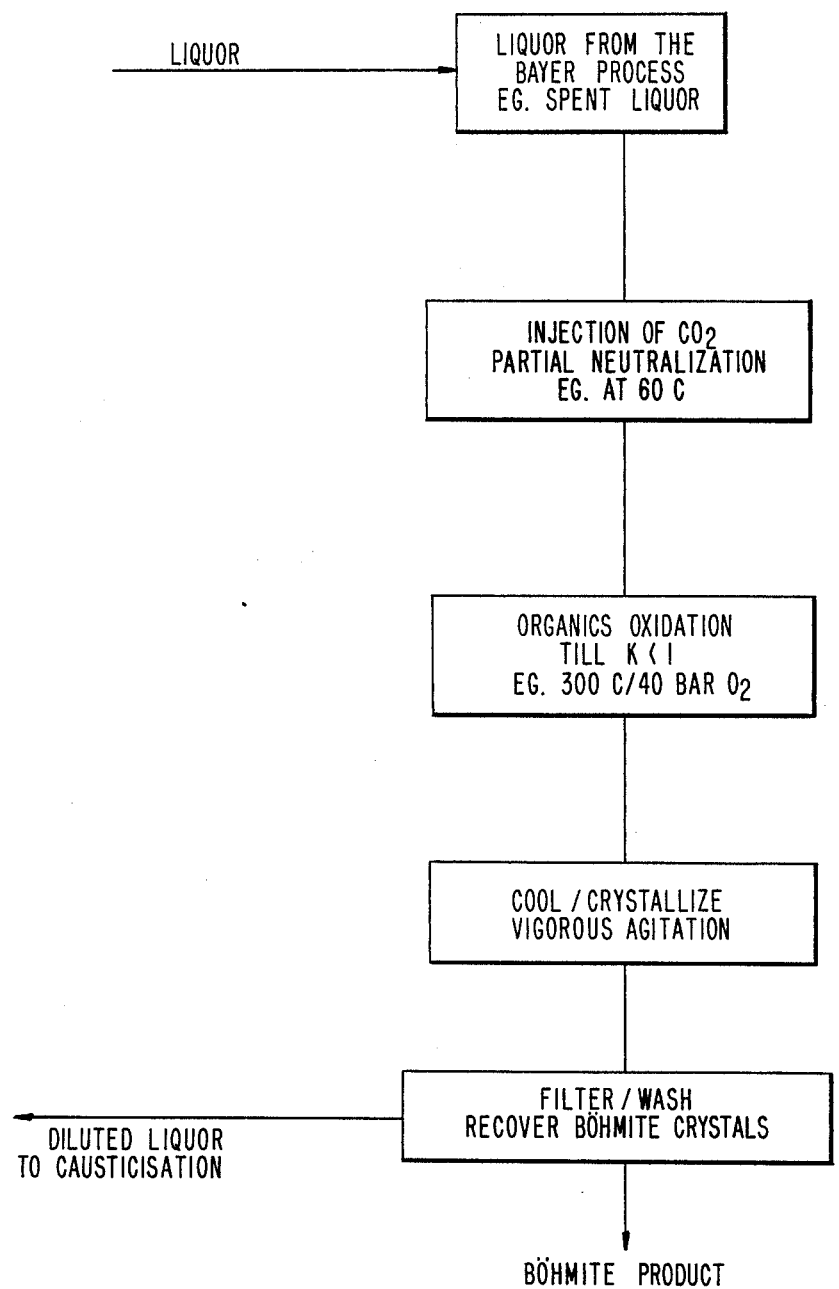
FIG. 1 is a diagrammatic flow sheet of a preferred embodiment of the process of the present invention.

In one aspect, the present invention provides a process for producing fine, tabular boehmite crystals. The process is carried out by contacting a Bayer process (or other similar $Na_2O$- and $Al_2O_3$- containing) liquor with an oxygen-containing gas at elevated temperature and pressure until a molar ratio of less than or equal to 1 is achieved. The oxidized liquor is then cooled, under hydrodynamic conditions of vigorous agitation, inducing nucleation and crystallization of boehmite. The boehmite recovered is of a tabular form, preferably and of a fine size, substantially in the range of 0.2-0.8 microns).

In another aspect, the present invention provides a process for the production of fine, tabular alpha-alumina monohydrate crystals. The process comprises providing a caustic aluminate-containing liquor having a molar ratio of $Na_2O_{free}$ to $Al_2O_3$ of less than or equal to one; the liquor is essentially free of copper ions and is at an elevated temperature and an elevated pressure. The liquor is then cooled under conditions of vigorous agitation so that alpha-alumina monohydrate nucleation and crystallization occurs. The thus precipitated alpha-alumina monohydrate crystals are then recovered.

DETAILED DESCRIPTION OF THE INVENTION

In accordance with the present invention, organics oxidation of a spent Bayer liquor or other $Na_2O/Al_2O_3$ containing liquor is carried out in the absence of copper ions and boehmite crystallization is carried out under hydrodynamic conditions, e.g. in an autoclave equipped with a mechanical means for agitation. Hydrodynamic conditions are defined as vigorous agitation causing rapid movement of the liquor in the reaction. The particle size and form of the resulting product is a fine, tabular boehmite. The maximum amount of copper present in the crystals of the present invention is equivalent to less than 1mg/L of copper in the oxidized solution, where the method of boehmite crystallization is homogeneous nucleation. If the tabular crystals of the present invention are used as seeds for the crystallization, then higher amounts of copper ions could be tolerated.

Copending U.S. Pat. Application Ser. No. 847,634 teaches that, in order to ensure the precipitation of boehmite in the autoclave as the system is cooled back to conditions of atmospheric temperature and pressure, the following critical condition must be attained in the oxidized liquor:

$$K \leq 1$$

defined as the molar ratio of $Na_2O_{free}/Al_2O_3$.

A K of less than or equal to 1 is also preferred in the process of the present invention.

A Bayer process caustic aluminate liquor or a synthetic caustic aluminate liquor of an appropriate composition is employed as the starting material for the practice of the present invention. As used herein, an appropriate liquor composition is defined as that obtained from the Bayer process following the precipitation of aluminum trihydroxide, and generally ranges between about 120 g/lt and about 150 g/lt caustic and between about 70 g/lt and about 90 g/lt alumina. Such liquor typically contains organic carbon compounds and 20-30 g/lt $Na_2CO_3$. If the starting liquor has a high concentration of $Na_2O_{free}$ in relation to the $Al_2O_3$ (i.e., a K of more than about one), then the concentration of $Na_2O_{free}$ must be lowered in order to alter the molar ratio. In a particularly preferred embodiment of the present invention, $CO_2$ gas is first injected into a high-K Bayer liquor. As a result of liquor carbonation, the $Na_2O_{free}$ concentration is reduced (by partial neutralization of the free caustics present in this liquor), and the molar ratio, K, decreases to less than or equal to one.

The amount of $CO_2$ gas injected is calculated on the basis of how much $Na_2O_{free}$ must be converted to sodium carbonate by reacting with $CO_2$ to lower the value of K to less than or equal to 1. As $CO_2$ gas is introduced, small samples (e.g. 2 ml) are removed from the liquor and the pH is determined. As the pH is lowered by the conversion of the free caustic to sodium carbonate, the amount of $Na_2O_{free}$ can be calculated. When $Na_2O_{free}$ reaches the desired concentration, $CO_2$ gas bubbling is stopped. This step is carried out at a temperature broadly ranging between about 50° C. and about 70° C. and preferably at about 60 C., in an autoclave equipped with means for mechanical agitation. The liquor is then oxidized under standard oxidation conditions, e.g. 300° C., 40 bar $O_2$ and held at this temperature and pressure for between about 60 and 120 minutes, and preferably 90 minutes. As the autoclave is cooled down so that boehmite will precipitate out of solution, the autoclave contents are mechanically agitated preferably using a means for agitation capable of operating at between about 1,000 to 2,000 RPM. This causes the boehmite to precipitate in the form of crystals of the desired size and shape in accordance with the present invention. The boehmite-containing slurry is filtered, typically under vacuum, and the solids washed with hot (i.e., 80-95° C.) water The liquor remaining after solids separation can be diluted as necessary and returned to the main Bayer process via a causticisation step using, for example, lime to recover caustic.

In an alternative embodiment, another oxygen-containing gas, such as an air/oxygen mixture, can be used as an oxidizing agent instead of oxygen gas. Assuming the same total amount of oxygen used, the oxidizing reaction should be preferably performed at higher pressures and may also require longer retention times.

A flow diagram, showing typical operating conditions for the practice of a preferred embodiment of the present invention, is presented in FIG. 1.

In another alternative embodiment of the present invention, aluminum hydroxide or other aluminum compounds may be added to the liquor prior to organics oxidation in order to adjust the molar ratio. If the liquor has an exceptionally high organic carbon content (relative to the excess of moles of $Na_2O_{free}$ over moles of $Al_2O_3$), neither injection of $CO_2$ gas nor addition of aluminum compounds is necessary, and the liquor can be used directly. This is because sufficient $CO_2$ will be produced upon oxidation of the organics to effect the desired neutralization degree for the castic. In the latter case, "exceptionally high" is defined as having at least about 20g of carbon per liter of liquor. The liquor obtained after organics oxidation will have the appropriate molar ratio (i.e., less than or equal to 1) for producing the boehmite of the present invention. [The liquor obtained is preferably essentially free of organic carbon.

Essentially free is defined as having no more than about 15% of the original organic carbon during the crystallization step.]Appropriate operating conditions for this embodiment are as follows: oxygen pressure, 20–40 bar, reaction temperature, 260°–300° C retention time, 60°–120 minutes, boehmite crystallization temperature 140°–150° C., 1000–2000 RPM agitation and 30–60 minutes retention time for the crystallization step. The 1000 RPM agitation level is preferred. A lower agitation level limit in terms of energy input depends upon the mixing equipment used. The objective is to prevent agglomeration of the resultant boehmite crystals.

In yet another alternative embodiment, organic carbon compounds, such as those normally present in Bayer liquors, are added to reduce the $Na_2O_{free}$ levels of the caustic aluminate liquor by organic carbonation. The amounts of such compounds are selected according to the composition of the liquor to be oxidized, i.e., according to the amount of $Na_2O_{free}$ that has to be carbonated (1 mole of organic carbon will, when oxidized, carbonate 1 mole of $Na_2O_{free}$).

The introduction of $CO_2$ gas to the Bayer liquor prior to organics oxidation serves two purposes. It ensures that the molar ratio, (K value), attained during organics oxidation will, in practice, be less than or equal to 1 (without having to measure the organic carbon content of the liquor). Additionally, it compensates in part for the lack of copper catalyst ions, although the latter is not critical as it is possible to compensate for the absence of catalyst ions by extending the retention time at the oxidation reaction temperature, i.e., extending the time the solution is held at a temperature between 260° and 300°, from about 60 minutes up to about 120 minutes. The copper ions speed up the oxidation reaction, and therefore shorten the rection time by catalytic action. If there is no copper present, then the reaction time must be extended in order to compensate. If $CO_2$ is used, then the reaction time can be reduced.

Figure 2A:
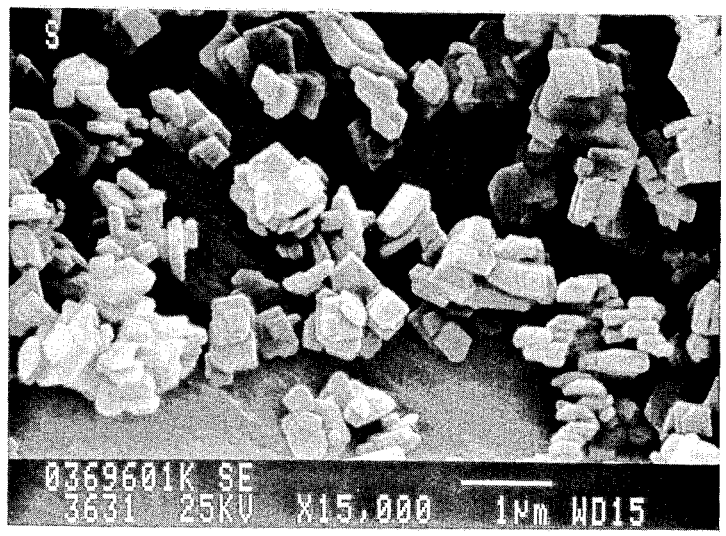
FIG. 2 is a scanning electron micrograph of boehmite product obtained in accordance with the process of the present invention at (a) 10,000 × and (b) 40,000 × magnification.
Figure 2B:
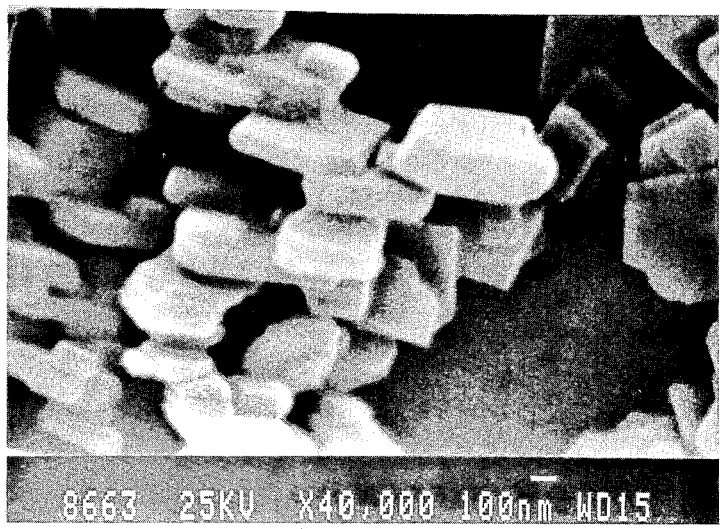

FIG. 2 is a scanning electron micrograph illustrating a specimen of a fine crystal boehmite product obtained using the method of the present invention. The micrograph clearly shows the fineness of the boehmite product and the distinctly tabular aspect of the crystals. The crystals have several essentially flat surfaces or faces with two opposing faces having a substantially greater area than the remaining faces. By "substantially greater area" we mean at least twice the area. The crystal size distribution was measured by Quantitative Image Analysis.

Figure 3:
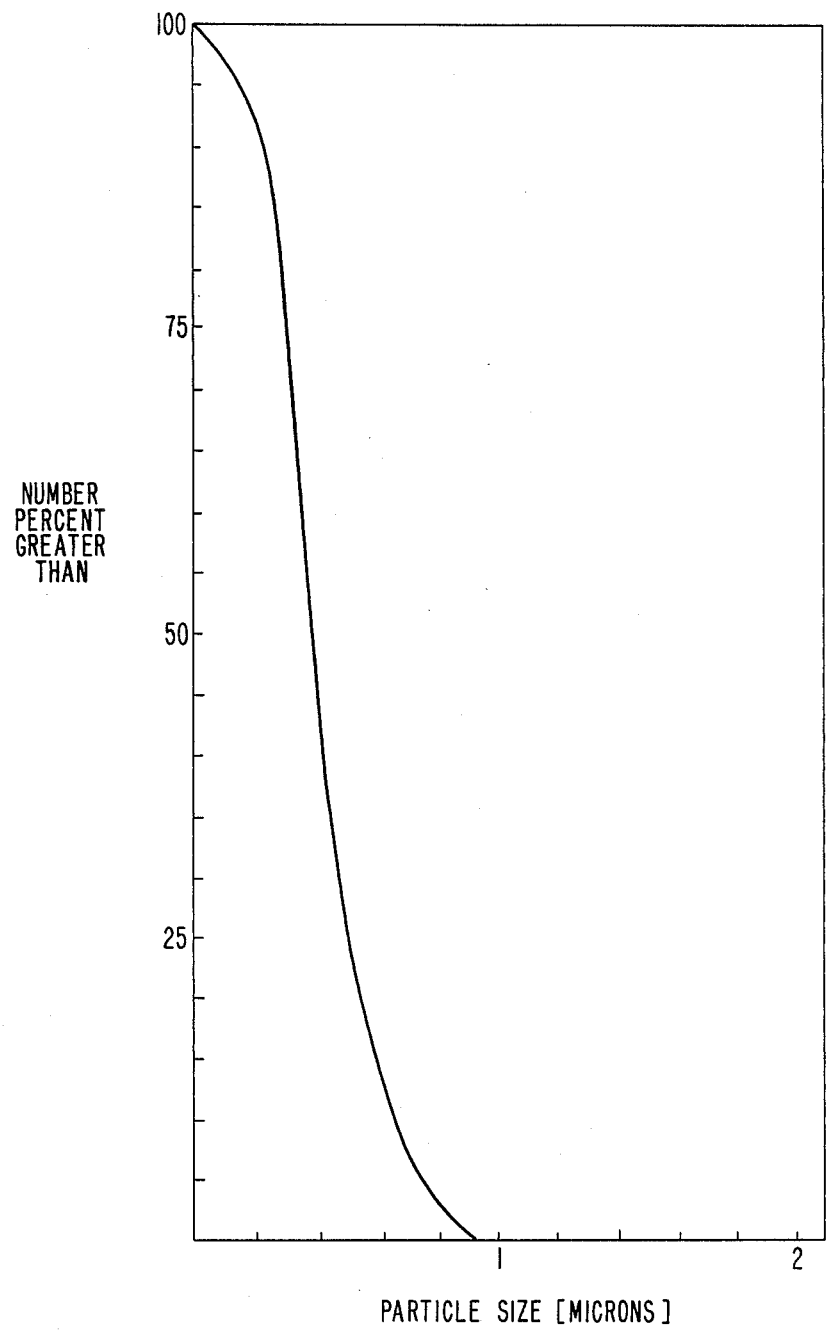
FIG. 3 is a Quantitative Image Analysis of the crystal size distribution of the boehmite product obtained in accordance with the process of the present invention.

Quantitative image analysis is performed as follows: enlarged SEM micrographs of the tabular boehmite are used to determine crystal size distribution. By using a video camera, a micrograph image is transferred to a television-type screen which is activated by a light pen, as the outline of each crystal is traced. The computer-controlled image analyzer produces a best fit for each crystal and displays an average diameter distribution for the boehmite crystals. Individual crystals within agglomerates were separated visually, while polycrystalline aggregates were treated in a similar way with individual crystals separated only where there was no obvious symmetry relationship involved. The Quantitative Image Analysis is shown in FIG. 3.

The average particle size is 0.5 microns, within a size range of about 0.2 to about 0.8 microns.

Other physical and chemical properties determined for the boehmite product are as follows:

| | |
|---|---|
| Specific Surface Area (As determined by gas adsorption) | 5.0 m²/g |
| Loss-on-Ignition | 15.0% |
| Total $Na_2O$ | 0.20% |

Figure 4:
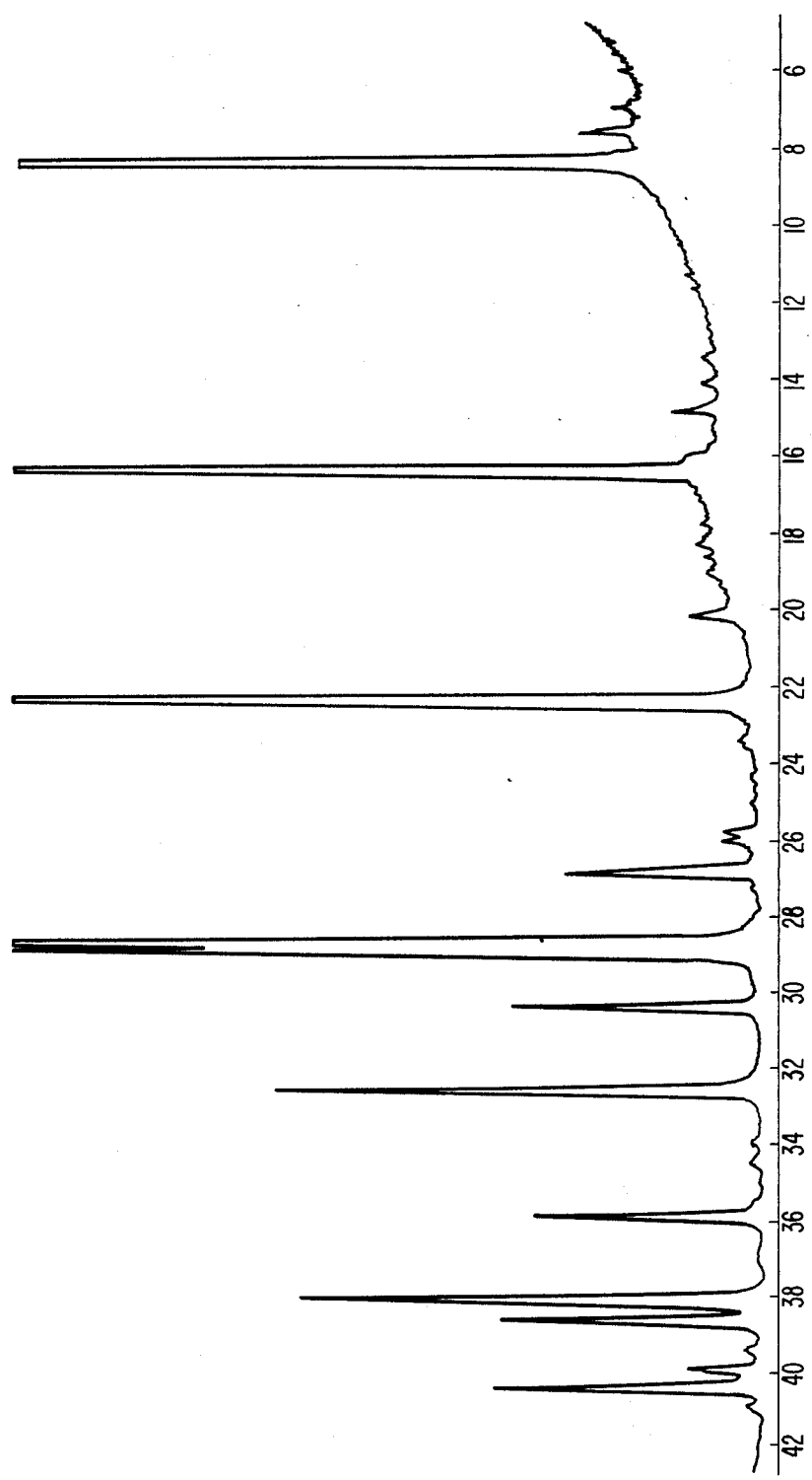
FIG. 4 is an X-ray diffractogram of the boehmite product obtained in accordance with the process of the present invention.

The high crystallinity of the boehmite product and the complete absence of any other forms of aluminum hydroxide was confirmed by X-ray diffraction. The diffractogram is shown in FIG. 4 and the only peak observed in the region of alumina monohydrate corresponded to 100% boehmite, i.e., all of the alumina monohydrate precipitated by the present process is boehmite.

In addition, the present inventor has found that a significant amount (up to 40%) of the crystals formed have a new and unexpected hexagonal shape, which is unusual for boehmite crystals.

The present invention is further described below in specific examples which are intended to illustrate the practice of the invention without limiting its scope.

EXAMPLE 1

One liter of Bayer spent liquor having the following composition:

| | |
|---|---|
| $Na_2O_{free}$ | 139 g/l |
| $Al_2O_3$ | 82 g/l |
| Organic Carbon | 16.7 g/l |
| Sodium Oxalate | 2.1 g/l | was injected with $CO_2$ gas under conditions of atmospheric temperature and pressure in a 3 liter capacity nickel alloy (Inconel) autoclave equipped with a mechanical agitator capable of operating at up to 2000 RPM. As a result of liquor carbonation, the $Na_2O_{free}$ concentration was reduced from 139 to 112 g/l. Oxygen gas was then introduced into the autoclave up to a pressure of 40 bar (as measured at 25° C.) and the temperature of the liquor in the autoclave was raised to 300° C. and held at this temperature for 90 minutes. Thereafter, the composition of the oxidized liquor in the autoclave was:

| | |
|---|---|
| $Na_2O_{free}$ | 46 g/l |
| $Al_2O_3$ | 82 g/l |
| Organic Carbon | 3.4 g/l |
| Sodium Oxalate | 4.9 g/l |

The organics oxidation efficiency (i.e., the % reduction in organic carbon content) was thus approximately 80%.

The numerical value of K for the oxidized liquor of the above example was 0.92 (i.e., (46/82)×1.645). Upon cooling to about 90° C., which took 30–60 minutes, boehmite precipitated out of the oxidized liquor during the cooling step of the process in an amount of 43 g/l (expressed as alumina). The boehmite-containing slurry was filtered and the solids were washed with hot water. The liquor obtained after solids separation was diluted with water and returned to the main Bayer process after an alkaline treatment step using lime in order to recover caustic, as is well-known in the art.

The present invention has been described above with reference to preferred embodiments. It would be obvious to those of ordinary skill in the art that many additions, deletions, or substitutions can be made without departing from the spirit and scope of the invention as claimed below.

What is claimed is:

1. A process for the production of tabular boehmite crystals comprising the steps of:
   contacting a Bayer process liquor with an oxygen-containing gas at a temperature of between about 150° C. and about 300° C. and at a pressure of between about 1 bar $O_2$ and about 150 bar $O_2$, adjusting the molar ratio of $Na_2O_{free}$ to $Al_2O_3$ in said liquor by injecting $CO_2$ into said liquor, to be less than or equal to 1;
   cooling said Bayer process oxidized liquor under said pressure and simultaneously vigorously agitating said liquor to induce nucleation of a tabular boehmite; and
   recovering tabular boehmite crystals having an average diameter of between about 0.2 and 0.8 microns.

2. The process according to claim 1 comprising adjusting said molar ratio of said Bayer process oxidized liquor by said contacting step in combination with a step of adding aluminum hydroxide or aluminum compounds to the liquor prior to said contacting step.

3. The process according to claim 1 which comprises adding combustible organic carbon to said liquor prior to oxidation, such that upon said oxidation sufficient $CO_2$ will be generated to attain said molar ratio.

4. Tabular boehmite crystals produced by the process of claim 1 and having an average particle size of between 0.2 and 0.8 microns, with up to 40% of the crystals in a hexagonal shape, and a specific surface area of about 5 $m^2/g$.

5. A process for the production of tabular boehmite crystals comprising the steps of:
   providing a caustic aluminate-containing liquor with a molar ratio of $Na_2O_{free}$ to $Al_2O_3$ of less than or equal to one, said liquor being essentially free of copper ions,
   maintaining said liquor at an elevated temperature and pressure,
   cooling said liquor under vigorous agitation to induce crystallization of a tabular boehmite product having an average particle size of between about 0.2 and 0.8 microns.

6. The process of claim 5 wherein said liquor is a Bayer process liquor.

7. The process of claim 5 comprising obtaining said liquor by contacting a caustic aluminate-containing liquor also containing combustible organic carbon in an amount sufficient to generate $CO_2$ and having a molar ratio of more than one with an oxygen-containing gas under elevated temperature and pressure conditions until said molar ratio is less than or equal to one.

8. The process of claim 5 wherein said elevated temperature is within the range of about 150° C. and about 300° C. and said elevated pressure is within the range of greater than 1 to about 150 bar.

9. The process of claim 7 comprising adding aluminum-hydroxide or aluminum-oxide-containing compounds, to said liquor thereby increasing the denominator of said ratio, prior to said contacting step.

10. The process of claim 7 comprising injecting $CO_2$ gas in said liquor in an amount sufficient to carbonate a portion of said caustic prior to, during, or directly following said contacting step.

11. The process of claim 7 comprising adding organic carbon compounds to said liquor prior to said contacting step.

12. The process of claim 7 comprising obtaining said liquor of molar ratio of less than or equal to one by increasing the concentration of combustible organic carbon of said liquor having a molar ratio of more than one followed by said contacting step whereby oxidation of said combustible organic carbon takes place resulting in $CO_2$ formation during said oxidation step, the $CO_2$ reducing the $Na_{20free}$ concentration to produce a liquor of a molar ratio of less than or equal to one and essentially free of organic carbon.

13. The process of claim 7 comprising lowering the molar ratio to less than or equal to one by a combination of adding $CO_2$ gas into said liquor with a molar ratio of more than one and oxidizing said organic carbon to produce a liquor having a molar ratio of less than or equal to one and being essentially free of organic carbon.

14. The process of claim 7 comprising subjecting the liquor to said elevated temperature and pressure and said contacting step simultaneously.

15. The process of claim 7 comprising adjusting said molar ratio by starting with a Bayer process liquor having at least an amount of organic carbon content in excess of the amount which, when oxidized, converts the appropriate amount of free caustic to carbonate, thereby lowering the molar ratio to less than or equal to 1.

16. Tabular boehmite crystals produced by the process of claim 5, said crystals being within the size range of between about 0.2 and about 0.8 microns, and having a specific surface area of about $=m^2/g$.

17. Crystals prepared according to the process of claim 12 said crystals having one dimension selected from the group consisting of average height, width and length dimensions of said crystals of a size that is less than about 50% of the size of the other two dimensions, and having a specific surface area of about 5 $m^2/g$.

18. The process of claim 7 comprising oxidizing said organic carbon with said oxygen-containing gas under elevated temperature ranging between about 260 and about 300° C. and elevated pressures ranging between about 20 and 150 bar $O_2$ for a period of time sufficient to oxidize said combustible organic carbon so that said liquor will have no more than about 15% or organic carbon during said crystallization.

19. The process according to claim 1 wherein said molar ratio of said oxidized liquor is attained by starting with a Bayer liquor of sufficiently high organic carbon content such that upon said oxidation, sufficient $CO_2$ will be generated to attain said molar ratio.

* * * * *